(No Model.)

A. B. CAMERON.
COMPOSITE ORNAMENTAL PANEL.

No. 455,095. Patented June 30, 1891.

WITNESSES:
Gustave Dieterich
M. Bosch.

INVENTOR
Allan B. Cameron
BY Park Benjamin
his ATTORNEY.

THE NORRIS PETERS CO., PHOTO-LITHO., WASHINGTON, D. C.

UNITED STATES PATENT OFFICE.

ALLAN B. CAMERON, OF WILLIAMSPORT, PENNSYLVANIA.

COMPOSITE ORNAMENTAL PANEL.

SPECIFICATION forming part of Letters Patent No. 455,095, dated June 30, 1891.

Application filed February 4, 1891. Serial No. 380,139. (No model.)

*To all whom it may concern:*

Be it known that I, ALLAN B. CAMERON, of Williamsport, Lycoming county, Pennsylvania, have invented a new and useful Improvement in Composite Ornamental Panels, of which the following is a specification.

The object of my invention is to produce an ornamental surface of wood-work and any plastic compound which may be used for the decoration of walls, floors, furniture, &c.

My invention is a new article of manufacture, consisting in an open-work grille or lattice of wood having its interstices filled with any plastic compound, thus forming a solid slab or panel having an ornamental pattern on its surface.

Figure 1:
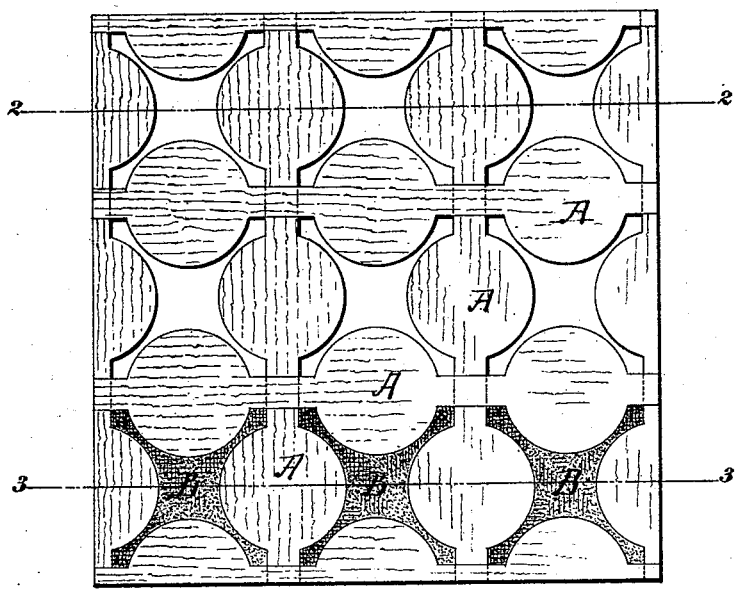
Figure 2:
Figure 3:
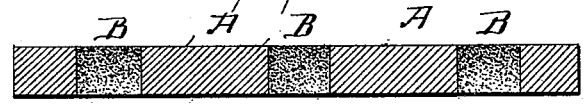

In the accompanying drawings, Figure 1 represents my ornamental slab or panel with a portion of the interstices in the grille filled with plastic material. Fig. 2 is a section on the line 2 2 of Fig. 1, and Fig. 3 is a section on the line 3 3 of Fig. 1.

Similar letters of reference indicate like parts.

The grille or lattice shown in Fig. 1 is constructed of the strips A A, which are produced by first cross-cutting the surface of a plank or board to give the desired configuration and then dividing said plank longitudinally. The said strips are then halved together to form the lattice. I fill the interstices of said grille with any plastic compound B, such as papier-maché, glue and sawdust frame-maker's composition, and allow the same to harden therein, after which the exterior surface of the panel is dressed off smooth. The composition may be colored, as desired, and by varying its color in different openings ornamental patterns may be produced.

I claim—

The method of producing a composite wood panel or slab, which consists in, first, making a grille of wood by cross-cutting a plank or board to a desired pattern or configuration, dividing said plank into strips, and then halving said strips together, and, second, filling the openings in said grille with a plastic composition.

ALLAN B. CAMERON.

Witnesses:
ADDISON CANDOR,
HUGH GILMORE.